United States Patent
Kim et al.

(10) Patent No.: US 12,406,991 B2
(45) Date of Patent: Sep. 2, 2025

(54) LITHIUM-SULFUR BATTERY

(71) Applicant: LG Energy Solution, Ltd., Seoul (KR)

(72) Inventors: Bong-Soo Kim, Daejeon (KR); Da-Young Kang, Daejeon (KR); So-Young Kim, Daejeon (KR); Jung-Hoon Han, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 0 days.

(21) Appl. No.: 18/544,234

(22) Filed: Dec. 18, 2023

(65) Prior Publication Data
US 2024/0396041 A1 Nov. 28, 2024

(30) Foreign Application Priority Data
May 23, 2023 (KR) .................. 10-2023-0066600

(51) Int. Cl.
| | |
|---|---|
| *H01M 4/58* | (2010.01) |
| *H01M 4/02* | (2006.01) |
| *H01M 4/136* | (2010.01) |
| *H01M 4/587* | (2010.01) |
| *H01M 10/052* | (2010.01) |
| *H01M 50/105* | (2021.01) |

(52) U.S. Cl.
CPC ......... *H01M 4/5815* (2013.01); *H01M 4/136* (2013.01); *H01M 4/587* (2013.01);
(Continued)

(58) Field of Classification Search
CPC .. H01M 4/5815; H01M 50/105; H01M 4/136; H01M 4/587; H01M 10/052; H01M 2004/028
See application file for complete search history.

(56) References Cited

U.S. PATENT DOCUMENTS

| | | | |
|---|---|---|---|
| 2011/0206992 A1* | 8/2011 | Campbell | H01M 4/661 264/109 |
| 2015/0010817 A1* | 1/2015 | Cui | H01M 10/052 429/231.95 |

(Continued)

FOREIGN PATENT DOCUMENTS

| | | | | |
|---|---|---|---|---|
| CN | 111490249 B | | 5/2022 | |
| EP | 3432388 A1 * | | 1/2019 | ........... C07D 233/61 |

(Continued)

OTHER PUBLICATIONS

Palissat, Geraldine. "Lithium-Sulphur Batteries: Opportunities and Challenges for Space Applications" EUCASS 8th European Conference for Aeronautics and Space Sciences, 2019 DOI: 10.13009 (Year: 2019).*

(Continued)

*Primary Examiner* — Ula C Ruddock
*Assistant Examiner* — Olivia Mason Ruggiero
(74) *Attorney, Agent, or Firm* — Bryan Cave Leighton Paisner LLP

(57) ABSTRACT

A lithium-sulfur battery capable of retaining excellent energy density and capacity even when discharged at a fast rate and a method of manufacturing the same are provided. The lithium-sulfur battery has a ratio of an amount of lithium sulfide ($Li_2S$) present at 100% depth of discharge state (DoD 100) of the lithium-sulfur battery discharged at 1.0 C to an amount of lithium sulfide ($Li_2S$) present at DoD 100 of the lithium-sulfur battery discharged at 0.5 C of 80% or more.

10 Claims, 5 Drawing Sheets

(52) U.S. Cl.
CPC ....... *H01M 10/052* (2013.01); *H01M 50/105* (2021.01); *H01M 2004/028* (2013.01)

(56) References Cited

U.S. PATENT DOCUMENTS

| | | | |
|---|---|---|---|
| 2020/0227725 A1* | 7/2020 | Joo | H01M 4/663 |
| 2021/0020940 A1* | 1/2021 | Lee | H01M 4/364 |
| 2021/0098770 A1* | 4/2021 | Yudi | H01M 4/0402 |
| 2022/0294002 A1* | 9/2022 | Kim | H01M 4/405 |
| 2023/0238584 A1 | 7/2023 | Park et al. | |
| 2023/0299346 A1 | 9/2023 | Park et al. | |

FOREIGN PATENT DOCUMENTS

| | | | |
|---|---|---|---|
| KR | 10-2014-0073888 A | 6/2014 | |
| KR | 10-2115595 B1 | 5/2020 | |
| KR | 10-2021-0088025 A | 7/2021 | |
| KR | 10-2021-0115319 A | 9/2021 | |
| KR | 10-2022-0099660 A | 7/2022 | |
| KR | 10-2022-0108959 A | 8/2022 | |

OTHER PUBLICATIONS

Dan Sun et al., "High lithium sulfide loading electrodes for practical Li/S cells with high specific energy", Nano Energy, vol. 64, (2019), pp. 1-10.

Hyungjun Noh et al., "A new insight on capacity fading of lithium-sulfur batteries: The effect of Li2S phase structure", Journal of Power Sources, vol. 293, (2015), pp. 329-335.

Sang-Eun Cheon et al., "Rechargeable Lithium Sulfur Battery", Journal of The Electrochemical Society, vol. 150, (2003), pp. A800-A805.

Canas et al. "In-situ X-ray diffraction studies of lithiumesulfur batteries," Journal of Power Sources 226 (2013) 313-319.

* cited by examiner

LITHIUM-SULFUR BATTERY

CROSS-REFERENCE TO RELATED APPLICATIONS

This application claims the benefit of and priority to Korean Patent Application No. 10-2023-0066600, filed on May 23, 2023, the disclosures of which are incorporated herein by reference in their entirety.

TECHNICAL FIELD

The present disclosure relates to a lithium-sulfur battery, particularly to a lithium-sulfur battery exhibiting excellent capacity even at a high discharge rate.

BACKGROUND ART

As the applications of a lithium secondary battery expands from portable electronic devices to electric vehicle (EVs) and electric storage systems (ESSs), the demand for a lithium secondary battery with high capacity, high energy density and long lifetime is increasing.

Among various lithium secondary batteries, a lithium-sulfur battery is a battery system which uses a sulfur-based material containing a sulfur-sulfur bond as a positive electrode active material and uses lithium metal, a carbon-based material wherein intercalation/deintercalation of lithium ions occurs, silicon or tin that forms an alloy with lithium, etc. as a negative electrode active material.

In the lithium-sulfur battery, sulfur, which is the main material of the positive electrode active material, is advantageous in that it has a small weight per atom, is abundant, easily available and inexpensive, is non-toxic, and is environment-friendly.

In addition, the lithium-sulfur battery exhibits a theoretical specific capacity of 1,675 mAh/g for a positive electrode where the conversion of lithium ions and sulfur occurs ($S_8+16Li^++16e^-\rightarrow 8Li_2S$) and a theoretical energy density of 2,600 Wh/kg for a negative electrode using lithium metal. Since it exhibits very high theoretical energy density than other currently studied battery systems (Ni-MH battery: 450 Wh/kg, Li—FeS battery: 480 Wh/kg, Li—$MnO_2$ battery: 1,000 Wh/kg, Na—S battery: 800 Wh/kg, lithium-ion battery: 250 Wh/kg), it is attracting attentions as a high-capacity, environment-friendly and inexpensive lithium secondary battery among the secondary batteries that are being developed currently.

In the lithium-sulfur battery, sulfur ($S_8$) accepts electrons and is converted to lithium polysulfides (LiPS, $Li_2S_x$, $1<x\leq 8$) through reductions and finally to lithium sulfide ($Li_2S$) at a positive electrode during discharge. Energy is released during each conversion.

The lithium-sulfur battery is a next-generation battery that is promising in areas where energy density is important, such as aviation. For the lithium-sulfur battery to exhibit high-output characteristics, the conversion of lithium polysulfide (LiPS), specifically from $Li_2S_8$ to $Li_2S_2$ and finally to lithium sulfide ($Li_2S$), should occur well even at a high discharge rate (C-rate). In particular, when considering the physical properties required for a drone with the minimum usage time of about 30 minutes, the ability to release enough energy even when discharged continuously at a discharge rate of 2.0 C may be required.

However, the lithium-sulfur batteries developed thus far have the problems that capacity retention rate is decreased greatly upon repeated charge/discharge since the step-by-step conversion is not achieved sufficiently when the discharge rate is increased and the charge/discharge efficiency decreases significantly. For this reason, the lithium-sulfur batteries developed thus far have the problem that they exhibit capacities lower than their theoretical capacities when the discharge rate is increased.

Therefore, development of a lithium-sulfur battery capable of retaining sufficient capacity even at a high discharge rate has been needed.

SUMMARY

The present disclosure is directed to providing a lithium-sulfur battery having superior capacity retention rate even under high output conditions.

In particular, the present disclosure is directed to providing a lithium-sulfur battery having superior capacity retention rate even at a discharge rate (C-rate) of 1.0 C or higher, for example at 2.0 C.

In an aspect of the present disclosure, there is provided a lithium-sulfur battery according to the following exemplary embodiment.

A lithium-sulfur battery according to a first exemplary embodiment includes: a positive electrode comprising a sulfur-carbon composite; a negative electrode; a separator between the positive electrode and the negative electrode; and an electrolyte, wherein the lithium-sulfur battery has a ratio R(1.0 C/0.5 C) according to the following Equation 1 of 80% or more.

$$R(1.0\ C/0.5\ C) = [A(DoD\ 100)_{1.0\,C}/A(DoD\ 100)_{0.5\,C}] \times 100(\%) \quad \text{[Equation 1]}$$

wherein $A(DoD\ 100)_{1.0\ C}$ is an amount of lithium sulfide ($Li_2S$) present at 100% depth of discharge state (DoD 100) of the lithium-sulfur battery discharged at 1.0 C, and $A(DoD\ 100)_{0.5\ C}$ is an amount of lithium sulfide ($Li_2S$) present at DoD 100 of the lithium-sulfur battery at 0.5 C.

In the first exemplary embodiment, the ratio R(1.0 C/0.5 C) may be determined based on a ratio of peak intensities of the lithium sulfide ($Li_2S$) in a scattering vector (q) region of from 1.85 to 1.92 Å$^{-1}$ in an X-ray diffraction (XRD) spectrum of the lithium-sulfur battery.

According to a second exemplary embodiment, in the first exemplary embodiment, the lithium-sulfur battery may have R(1.0 C/0.5 C) of 85% or more.

According to a third exemplary embodiment, in the first or second exemplary embodiment, the lithium-sulfur battery at DoD 100 may have a potential of 1.7-1.9 V.

According to a fourth exemplary embodiment, in any of the first to third exemplary embodiments, the lithium-sulfur battery at DoD 100 may have a potential of 1.8 V.

According to a fifth exemplary embodiment, in any of the first to fourth exemplary embodiments, the amount of the lithium sulfide ($Li_2S$) may be a weight, a volume or a number of moles of the lithium sulfide.

According to a sixth exemplary embodiment, in any of the first to fifth exemplary embodiments, the lithium-sulfur battery may have a weight ratio of the electrolyte solution to sulfur element(S) in the sulfur-carbon composite (El/S weight ratio) of 2.7 g/g or more.

According to an seventh exemplary embodiment, in any of the first to sixth exemplary embodiments, the electrolyte solution may include a non-water-based solvent, a lithium salt and an additive.

According to an eighth exemplary embodiment, in any of the first to seventh exemplary embodiments, the lithium-sulfur battery may have an energy density of 300 Wh/kg or more.

According to a ninth exemplary embodiment, in any of the first to eighth exemplary embodiments, the sulfur-carbon composite may include sulfur element(S) in an amount of 60-85 wt %.

According to a tenth exemplary embodiment, in any of the first to ninth exemplary embodiments, the positive electrode may comprise the sulfur-carbon composite in an amount of 90 wt % or more based on the total weight of the positive electrode.

According to an eleventh exemplary embodiment, in any of the first to tenth exemplary embodiments, the lithium-sulfur battery may be a coin-type battery, a pouch-type battery or a cylindrical battery.

In another aspect of the present disclosure, there is provided a method for evaluating the output characteristics of a lithium-sulfur battery according to the following exemplary embodiments.

The method for evaluating the output characteristics of a lithium-sulfur battery according to a twelfth exemplary embodiment includes:

determining a lithium-sulfur battery having a ratio R(1.0 C/0.5 C) according to the following Equation 1 of 80% or more as a high-output lithium-sulfur battery, $$R(1.0\ C/0.5\ C) = [A(DoD\ 100)_{1.0\ C}/A(DoD\ 100)_{0.5\ C}] \times 100(\%) \quad \text{[Equation 1]}$$

wherein

A(DoD 100)$_{1.0\ C}$ is an amount of lithium sulfide (Li$_2$S) present at 100% depth of discharge state (DoD 100) of the lithium-sulfur battery discharged at 1.0 C, and A(DoD 100)$_{0.5\ C}$ is an amount of lithium sulfide (Li$_2$S) present at DoD 100 of the lithium-sulfur battery discharged at 0.5 C.

In the twelfth exemplary embodiment, the ratio R(1.0 C/0.5 C) is determined based on a ratio of peak intensities of the lithium sulfide (Li$_2$S) in a scattering vector (q) region of from 1.85 to 1.92 Å$^{-1}$ in an X-ray diffraction (XRD) spectrum of the lithium-sulfur battery.

According to a thirteenth exemplary embodiment, in the twelfth exemplary embodiment, the high output lithium-sulfur battery may be, for example, a battery which maintains an energy density of 300 Wh/kg or more at room temperature when discharged at 1.0 C-rate or higher.

According to a fourteenth exemplary embodiment, in the twelfth or thirteenth exemplary embodiment, the room temperature may be from 23 to 25° C.

The lithium-sulfur battery according to an aspect of the present disclosure is advantageous in that it exhibits enough energy density and capacity even when discharged at a high C-rate.

Specifically, it may maintain superior energy density and capacity achieved when discharged at a rate of 0.5 C even when discharged at a rate of 1.0 C or higher.

In particular, the lithium-sulfur battery of the present disclosure may exhibit a specific capacity of 1,000 mAh/g or higher.

In addition, the lithium-sulfur battery of the present disclosure may exhibit an energy density of 300 Wh/kg or higher.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not to be construed as being limited to the drawings. In the drawings included in the present specification, the shape, size, scale, proportion, etc. of elements may be exaggerated for more clear description.

DETAILED DESCRIPTION

Figure 1:
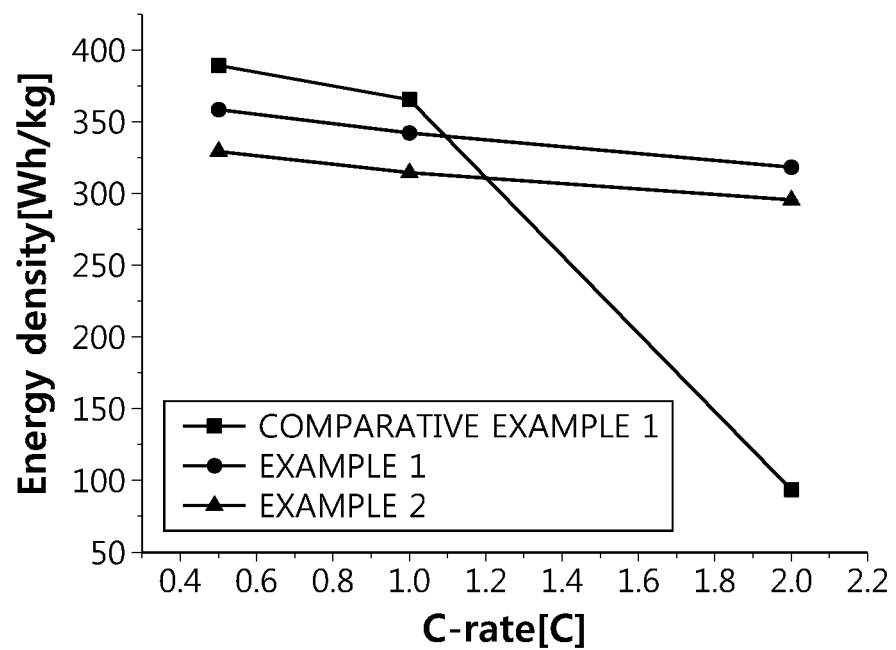
FIG. 1 shows the energy density of lithium-sulfur batteries of Example 1, Example 2 and Comparative Example 1 depending on discharge C-rate.

Hereinafter, the present disclosure is described in more detail.

The terms or words used in the present specification and claims should not be construed as being limited to their ordinary or dictionary meanings, and should be interpreted as meanings and concepts consistent with the technical idea of the present disclosure based on the principle that an inventor may properly define the concept of terms to best explain his/her invention.

The terms used in the present disclosure are used only to describe specific exemplary embodiments, and are not intended to limit the present disclosure. Singular expressions include plural expressions unless the context clearly indicates otherwise. In the present disclosure, the terms such as "include", "have", etc. are intended to indicate that there exists a feature, number, step, operation, component, part or combinations thereof stated in the specification but it should be understood that the presence or addition of other features, numbers, steps, operations, components, parts or combinations thereof is not precluded.

In addition, throughout the specification, when a part is described to "include (or comprise)", "have" or "be equipped with" a certain component, it means that it can further include other components rather than excluding other components, unless stated otherwise.

Throughout the present specification, the description "A and/or B" means "A or B" or "A and B".

Throughout the present specification "C-rate" refers to current rate and means a value representing the rate at which a battery is charged or discharged. Throughout the present specification, the "C-rate" may also be abbreviated as "C".

Throughout the present specification, temperature is indicated on the Celsius scale, in ° C. unit, unless specified otherwise.

The term "composite" used in the present specification refers to a material which exhibits more effective functions as two or more different materials are combined to form physically or chemically different phases.

The term "(poly) sulfide" used in the present disclosure includes both "(poly) sulfide ions ($S_x^{2-}$, 1≤x≤8)" and "lithium (poly) sulfides ($Li_2S_x$ or $Li_2S_x^-$, 1≤x≤8)".

The term "polysulfide" used in the present disclosure includes both "polysulfide ions ($S_x^{2-}$, 1<x≤8)" and "lithium polysulfides ($Li_2S_x$ or $Li_2S_x^-$, 1<x≤8)".

When the lithium-sulfur battery is discharged, energy is released from the positive electrode as the starting material sulfur ($S_8$) is converted to lithium polysulfide (LiPS) and then to lithium sulfide ($Li_2S$).

In an aspect, the present disclosure provides a lithium-sulfur battery wherein the conversion described above is realized stably even when it is discharged at a high discharge rate.

The lithium-sulfur battery according to an aspect of the present disclosure includes: a positive electrode; a negative electrode; a separator disposed between the positive electrode and the negative electrode; and an electrolyte, wherein the positive electrode is equipped with a positive electrode active material including a sulfur-carbon composite.

In the lithium-sulfur battery, the amount of $Li_2S$ produced when discharged to DoD (depth of discharge) 100 at 1.0 C-rate is 80% or higher of the amount of $Li_2S$ produced when discharged to DoD 100 at 0.5 C-rate.

In an exemplary embodiment of the present disclosure, the amount of $Li_2S$ produced when discharged to DoD (depth of discharge) 100 at 1.0 C-rate may be 85% or higher of the amount of $Li_2S$ produced when discharged to DoD 100 at 0.5 C-rate.

In an exemplary embodiment of the present disclosure, the sulfur-carbon composite may include at least one of sulfur and a sulfur-based compound. The sulfur-based compound collectively refers to a material containing sulfur(S).

When the sulfur-carbon composite contains sulfur ($S_8$), lithium (poly) sulfide is formed in the positive electrode of the lithium-sulfur battery during discharge through reduction. If the formed lithium polysulfide is dissolved by the electrolyte and eluted from the positive electrode to the electrolyte phase, the amount of lithium (poly) sulfide oxidized at the positive electrode while the lithium-sulfur battery is charged is decreased and, consequently, the capacity of the lithium-sulfur battery may be decreased.

For example, the sulfur-based compound may include any sulfur-containing compound that can be formed through reduction of inorganic sulfur ($S_8$) or oxidation of lithium sulfide ($Li_2S$). More specifically, it may include one or more of lithium sulfide ($Li_2S$), lithium polysulfide ($Li_2Sx$, 1<x≤8), a disulfide compound, a carbon-sulfur polymer (($C_2S_y)_n$, 2.5≤y≤50, n≥2) and lithium sulfide ($Li_2S$).

If the lithium-sulfur battery includes inorganic sulfur ($S_8$) as the positive electrode active material, the sulfur is reduced to lithium polysulfide ($Li_2Sx$, 1<x≤8) through reduction at the positive electrode during discharge of the lithium-sulfur battery, and the lithium polysulfide is reduced again to lithium sulfide ($Li_2S$). But, if the lithium-sulfur battery is discharged at a high C-rate, the amount of lithium sulfide ($Li_2S$) produced during the discharge may decrease due to insufficient reduction and the capacity may decrease significantly.

As such, when the conventional lithium-sulfur battery is discharged at a high C-rate, the capacity of the battery may decrease due to decreased reduction efficiency of the positive electrode.

However, the lithium-sulfur battery according to an aspect of the present disclosure is advantages in that, since the amount of $Li_2S$ produced during discharge to DoD 100 at 1.0 C-rate is 80% or higher, specifically 85% or higher, as compared to the amount produced during discharge to DoD 100 at 0.5 C-rate, the decrease in capacity is smaller even when the battery is discharged at a high C-rate.

In the present specification, the DoD 100 refers to a state wherein the depth of discharge is 100% from the state of SoC (state of charge) 100%, i.e., a completely discharged state, and may also be expressed as SoC 0%.

In an exemplary embodiment of the present disclosure, the DoD 100 may be, for example, a state having a potential of 1.7-1.9 V, specifically a state having a potential of 1.8 V, although the present disclosure is not limited thereto.

Specifically, a lithium-sulfur battery having a ratio R(1.0 C/0.5 C) defined by Equation 1 of 80% or higher may exhibit high-output characteristics.

$$R(1.0\ C/0.5\ C) = [A(DoD\ 100)_{1.0\,C}/A(DoD\ 100)_{0.5\,C}] \times 100(\%)$$ [Equation 1]

In Equation 1, the $A(DoD\ 100)_{1.0\,C}$ is the amount of lithium sulfide ($Li_2S$) existing in the state of DoD 100 after discharge at 1.0 C, and the $A(DoD\ 100)_{0.5\,C}$ is the amount of lithium sulfide ($Li_2S$) existing in the state of DoD 100 after discharge at 0.5 C.

According to Equation 1, the ratio of the amount of lithium sulfide produced in the lithium-sulfur battery when it is completely discharged to DoD 100 at a rate of 1.0 C and the amount of lithium sulfide produced in the lithium-sulfur battery when it is completely discharged at a rate of 0.5 C can be derived. As the ratio is higher, the conversion efficiency of $S_8 \rightarrow Li_2S_x$ (1<x≤8)$\rightarrow Li_2S$ (lithium sulfide) in the positive electrode active material in a high-output state is maintained superiorly.

In an exemplary embodiment of the present disclosure, the ratio R(1.0 C/0.5 C) of lithium sulfide ($Li_2S$) may be specifically 88% or higher or 90% or higher. For example, the ratio R(1.0 C/0.5 C) of lithium sulfide ($Li_2S$) may be 80-100%, 85-100%, 88-99%, 90-95%, 85-93%, 88-93%, 90-93% or 91-93%.

In the present specification, the amount of the lithium sulfide ($Li_2S$) may mean weight, volume or mole. The "amount" is not specially limited to weight, volume or mole as long as the $A(DoD\ 100)_{1.0\,C}$ and the $A(DoD\ 100)_{0.5\,C}$ are measured with the same standard for the measurement of the ratio.

In an exemplary embodiment of the present disclosure, the amount of $Li_2S$ in the lithium-sulfur battery in the discharged state may be measured in a destructive manner, i.e., by disassembling the battery. But it may be specifically measured in a non-destructive manner in order to prevent the loss of $Li_2S$ in the battery, reduce analysis time, etc.

For example, the amount of $Li_2S$ in the lithium-sulfur battery in the discharged state may be measured by non-destructive X-ray diffraction (XRD) analysis. Specifically, the $Li_2S$ has characteristic peaks in the scattering vector (q)

region of 1.85-1.92 Å$^{-1}$ in the spectrum obtained through X-ray diffraction analysis. Accordingly, the ratio of the amount of Li$_2$S may be measured based on the ratio of the peak intensities (i.e., scattering intensities) in the X-ray diffraction spectrum of the lithium-sulfur battery discharged to DoD 100 at different discharge rates, in the scattering vector (q) region of 1.85-1.92 Å$^{-1}$.

Therefore, in an exemplary embodiment of the present disclosure, the ratio R(1.0 C/0.5 C) may be determined based on the ratio of the peak intensities of the lithium sulfide (Li$_2$S) in the X-ray diffraction spectrum of the lithium-sulfur battery, and the lithium sulfide (Li$_2$S) may have characteristic peaks in the scattering vector (q) region of 1.85-1.92 Å$^{-1}$ in the X-ray diffraction spectrum.

In an exemplary embodiment of the present disclosure, the A(DoD 100)$_{x\ C}$ (x=0.5 or 1.0) may be measured from the peak intensities in the scattering vector (q) region of 1.85-1.92 Å$^{-1}$ in the X-ray diffraction spectrum obtained in the state of DoD 100 by discharging the lithium-sulfur battery at x C-rate. That is to say, the ratio R(1.0 C/0.5 C) may be measured by obtaining an X-ray diffraction spectrum in the state of DoD 100 by discharging the lithium-sulfur battery at 0.5 C-rate and substituting the peak intensity value in the scattering vector (q) region of 1.85-1.92 Å$^{-1}$ in the X-ray diffraction spectrum as A(DoD 100)$_{0.5\ C}$, and obtaining an X-ray diffraction spectrum in the state of DoD 100 by discharging the lithium-sulfur battery at 1.0 C-rate and substituting the peak intensity value in the scattering vector (q) region of 1.85-1.92 Å$^{-1}$ in the X-ray diffraction spectrum as A(DoD 100)$_{1.0\ C}$.

In an exemplary embodiment of the present disclosure, the X-ray diffraction spectrum may be obtained by irradiating X-ray with a wavelength ($\lambda$) of 0.7-0.8 Å to the lithium-sulfur battery at room temperature.

Specifically, the XRD analysis may be performed by operando X-ray diffraction (XRD) analysis during the operation of the battery. More specifically, the XRD pattern may be obtained by measuring 2 theta (2θ) values in the range of 4-17° at room temperature (23° C.) using Mo K-alpha X-ray ($\lambda$=0.709 Å) of PANalyical Empyrean XRD in transmission mode. Each pattern may be obtained for a total of 1 minute at 0.014° intervals.

After measuring the ratio of Li$_2$S in the respective discharged states, a lithium-sulfur battery having the ratio of 80% or higher, specifically 85% or higher, may be defined as a lithium-sulfur battery having high-output characteristics.

Hereinafter, the components of the lithium-sulfur battery are described in detail.

Positive Electrode

In an exemplary embodiment of the present disclosure, the positive electrode may include a positive electrode current collector and a positive electrode active material layer coated on one or both sides of the positive electrode current collector.

The positive electrode current collector is not specially limited as long as it supports the positive electrode active material and exhibits high conductivity without causing chemical change in the battery. For example, copper, stainless steel, aluminum, nickel, titanium, palladium, sintered carbon, copper or stainless-steel surface-treated with carbon, nickel, silver, etc., aluminum-cadmium alloy, etc. may be used.

Fine irregularities may be formed on the surface of the positive electrode current collector to strengthen the binding force with the positive electrode active material. Various forms such as a film, a sheet, a foil, a mesh, a net, a porous body, a foam, a nonwoven, etc. may be used.

The positive electrode active material layer includes the positive electrode active material and may further include a conductive material, a binder, an additive, etc.

In an exemplary embodiment of the present disclosure, the positive electrode active material includes a sulfur-carbon composite.

In an exemplary embodiment of the present disclosure, the sulfur-carbon composite may include: a porous carbon material; and a sulfur-based compound supported on at least one of the inner pores of the porous carbon material and the external surface of the porous carbon material. Since the sulfur acting as the positive electrode active material lacks electrical conductivity on its own, it may be composited with a conductive material such as a carbon material, and a porous carbon material may be used to support the sulfur. In addition, the sulfur-based compound is added as a positive electrode active material and may include, for example, one or more of inorganic sulfur (S$_8$), lithium sulfide (Li$_2$S), lithium polysulfide (Li$_2$S$_x$, 1<x≤8), a disulfide compound and a carbon-sulfur polymer ((C$_2$S$_y$)$_n$, 2.5≤y≤50, n≥2). Specifically, the sulfur-based compound may be inorganic sulfur (S$_8$).

In an exemplary embodiment of the present disclosure, the porous carbon material is not specially limited in type as long as it is a porous carbon material capable of improving the conductivity of the positive electrode while uniformly and stably supporting the sulfur-based compound as the positive electrode active material.

The porous carbon material may be generally prepared by carbonizing various precursors of carbon materials. The porous carbon material includes irregular pores therein. The pores may have an average diameter of 1-200 nm and a porosity corresponding to 10-90 vol % of the total volume of the porous carbon material. If the average diameter of the pores is smaller, the impregnation of sulfur is impossible because the pore size is only at a molecular level. In contrast, if the average diameter exceeds the above range, it is undesirable for preparation of an electrode because the mechanical strength of the porous carbon material is decreased.

In an exemplary embodiment of the present disclosure, the "average diameter of the pores" may be measured by a method of measuring the diameter of the pores of a porous material known in the art without special limitation. For example, the diameter of the pores may be measured by scanning electron microscopy (SEM), field emission electron microscopy, laser diffraction method or BET (Brunauer-Emmett-Teller) method. The measurement using the laser diffraction method may be conducted using, for example, a commercially available laser diffraction particle size analyzer (e.g., Microtrac MT 3000). In addition, a BELSORP series analyzer (BEL Japan) may be used for measurement by the BET method, although not being limited thereto.

In an exemplary embodiment of the present disclosure, the "porosity" refers to the ratio of the volume occupied by pores to the total volume of a structure in % unit, and may be used interchangeably with the terms pore ratio, degree of porosity, etc. In the present disclosure, the method for measuring porosity is not specially limited. In an exemplary embodiment of the present disclosure, it may be measured by the BET method using nitrogen gas, mercury (Hg) porosimetry or ASTM D2873.

The porous carbon material may be spherical, rod-shaped, needle-shaped, tube-shaped or bulk-type and is not limited in shape as long as it is one commonly used in a lithium-sulfur battery.

The porous carbon material may be any one commonly used in the art, which has a porous structure and a large specific surface area. For example, the porous carbon material may be one or more selected from a group consisting of graphite; graphene; carbon black such as denka black, acetylene black, ketjen black, channel black, furnace black, lamp black, thermal black, etc.; carbon nanotube (CNT) such as single-walled carbon nanotube (SWCNT), multi-walled carbon nanotube (MWCNT), etc.; carbon fiber such as graphite nanofiber (GNF), carbon nanofiber (CNF), activated carbon fiber (ACF), etc.; graphite such as natural graphite, artificial graphite, expandable graphite, etc.; and activated carbon, although not being limited thereto. Specifically, the porous carbon material may be carbon nanotube.

In an exemplary embodiment of the present disclosure, the porous carbon material may include, for example, carbon nanotube (CNT).

In an embodiment of the present disclosure, the porous carbon material may be prepared by a manufacturing method including a step of centrifugally milling a porous carbon material; and a step of filtering the centrifugally milled porous carbon material through a sieve, wherein a mesh size of the sieve is 2.8 to 4 times of a target D50 particle size of the porous carbon material.

In an embodiment of the present disclosure, the porous carbon material may satisfy one or more of the following conditions: (1) a sum of particle size D10 and particle size D90 is 60 μm or less; and (2) a broadness factor (BF) according to the following equation is 0.7 or lower:

$$\text{Broadness factor}(BF) = \frac{[D_{90} \text{ particle size of the porous carbon material}]}{[D_{10} \text{ particle size of the porous carbon material}] \times 10}.$$

In an exemplary embodiment of the present disclosure, the sulfur-carbon composite may have a sulfur/carbon (S/C) weight ratio of, for example, 5 g/g or lower, more specifically 2.5 g/g or lower. For example, the sulfur-carbon composite may have a sulfur/carbon weight ratio of 2.4 g/g. When the S/C ratio of the sulfur-carbon composite is within the above ranges, it may be advantageous in that the electron transfer ability (conductivity) and electrochemical specific surface area of the sulfur-carbon composite can be ensured. For example, it may be advantageous in that the elution of sulfur from the positive electrode is suppressed as the usable surface of the sulfur-carbon composite increases, although the present disclosure is not limited thereto.

The sulfur-carbon composite may be prepared by a method commonly used in the art without special limitation. For example, the composite may be prepared by simply mixing sulfur and a porous carbon material and then heat-treating the mixture.

The positive electrode active material may further include one or more selected from a transition metal element, a group IIIA element, a group IVA element, sulfur compounds of these elements, and alloys of these elements with sulfur.

The transition metal element may include Sc, Ti, V, Cr, Mn, Fe, Co, Ni, Cu, Zn, Y, Zr, Nb, Mo, Tc, Ru, Rh, Pd, Os, Ir, Pt, Au, Hg, etc., the group IIIA element may include Al, Ga, In, Ti, etc., and the group IVA element may include Ge, Sn, Pb, etc.

In an exemplary embodiment of the present disclosure, the content of the sulfur-carbon composite may be 50 wt % or more based on the total weight of the positive electrode. Specifically, the content of the sulfur-carbon composite may be, for example, 80 wt % or more, 90 wt % or more or 95 wt % or more, based on the total weight of the positive electrode. The sulfur-carbon composite may be included at a content of specifically 80-100 wt %, more specifically 85-99 wt %, 90-99 wt %, 95-98 wt %, 95-97 wt % or 96 wt % based on the total weight of the positive electrode active material layer. If the content of the sulfur-carbon composite is below the above ranges, it is difficult to embody a battery with high capacity and high energy density because the relative content of subsidiary materials such as the conductive material, a binder, etc. is increased and the content of the sulfur-carbon composite is decreased. And, if the content exceeds the above ranges, there is a problem that the physical properties of the electrode are deteriorated due to the relatively low content of the conductive material or binder.

The conductive material serves as a path for electrons to move from a current collector to the positive electrode active material by electrically connecting an electrolyte and the positive electrode active material. Any material which is physically distinguished from the carbon contained in the sulfur-carbon composite and has conductivity may be used without limitation.

In an exemplary embodiment of the present disclosure, the conductive material may be, for example, carbon black such as Super-P, denka black, acetylene black, ketjen black, channel black, furnace black, lamp black, thermal black, etc.; carbon derivatives such as carbon nanotubes, fullerene, etc.; conductive fibers such as carbon fiber, metal fiber, etc.; fluorocarbons; metal powders such as, aluminum and nickel powder; conductive polymers such as polyaniline, polythiophene, polyacetylene, polypyrrole, etc.; or combinations thereof.

In an exemplary embodiment of the present disclosure, the content of the conductive material may be 0-10 wt %, for example, 1-10 wt % based on the total weight of the positive electrode active material. If the content of the conductive material is below the above ranges, voltage and capacity may decrease because the electron transfer between the positive electrode active material and the current collector is not easy. On the contrary, if it exceeds the above ranges, the total energy (charge) of the battery may decrease due to the relatively decreased proportion of the positive electrode active material. Therefore, it is preferred that an appropriate content is determined within the above ranges.

In an exemplary embodiment of the present disclosure, the positive electrode may include a positive electrode active material and a binder polymer and may not include a conductive material. That is to say, the positive electrode may not include a conductive material other than the porous carbon material of the sulfur-carbon composite included in the positive electrode active material. Since the positive electrode does not include a conductive material, the amount of the positive electrode active material may be increased and, as a result, the energy density and/or capacity of the lithium-sulfur battery may be improved.

The binder polymer retains the positive electrode active material in the positive electrode current collector and increases binding between them by organically connecting the positive electrode active material. Any binder polymer known in the art may be used.

For example, the binder polymer may include a fluorine resin-based binder including polyvinylidene fluoride (PVDF), polytetrafluoroethylene (PTFE), etc.; a rubber-based binder including styrene-butadiene rubber (SBR), acrylonitrile-butadiene rubber, styrene-isoprene rubber, etc.; a cellulose-based binder including carboxymethyl cellulose (CMC), starch, hydroxypropyl cellulose, regenerated cellulose, etc.; a polyalcohol-based binder; polyethylene, polypropylene, etc.; a polyolefin-based binder; a polyimide-based binder; a polyester-based binder; a polyacrylate-based binder such as polyacrylic acid (PAA), etc.; a silane-based binder; a polyurethane-based binder; or mixtures thereof. In addition, the binder polymer may include a copolymer containing a repeating unit derived from two or more of the binders described above.

The content of the binder polymer may be 0.5-30 wt % based on 100 wt % of the positive electrode active material layer. When the content of the binder polymer is within the above ranges, the separation of the active material and the conductive material in the positive electrode may be prevented due to improved physical properties of the positive electrode and the battery capacity may be ensured because the ratio of the active material and the conductive material in the positive electrode is controlled adequately.

In the present disclosure, the method for preparing the positive electrode for a lithium secondary battery is not particularly limited. It may be prepared by methods known to those skilled in the art or modifications thereof.

As an example, the positive electrode for a lithium secondary battery may be prepared by preparing a positive electrode slurry composition with the composition described above and then forming a positive electrode active material layer by coating it on at least one surface of a positive electrode current collector.

The positive electrode slurry composition contains the positive electrode active material described above and may further contain a binder, a conductive material and a solvent.

As the solvent, one that can uniformly disperse the positive electrode active material is used. As the solvent, water is the most preferred as a water-based solvent. The water may be distilled water or deionized water. However, the present disclosure is not necessarily limited thereto and, if necessary, a low-grade alcohol that can be easily mixed with water may be used. As the low-grade alcohol, methanol, ethanol, propanol, isopropanol, butanol, etc. may be used, and they can be specifically mixed with water.

The content of the solvent may be at a level allowing easy coating, and the specific content varies depending on the coating method and device.

The positive electrode slurry composition may further contain materials commonly used for improving functions if necessary. For example, it may contain a viscosity modifier, a glidant, a filler, etc.

The method for coating the positive electrode slurry composition is not specially limited in the present disclosure. For example, bar coating, doctor blading, die casting, comma coating, screen printing, dip coating, reverse roll coating, direct roll coating, gravure coating, extrusion, etc. may be used. In addition, the positive electrode active material layer may be formed on a separate substrate and then coated on a positive electrode current collector by pressing or lamination.

The amount of the positive electrode slurry composition coated on the current collector is not specially limited and may be adjusted in consideration of the thickness of the positive electrode active material layer.

After coating, a drying process may be performed to remove the solvent. The drying process is performed under the temperature and time conditions where the solvent can be removed enough, although the conditions are not specially limited in the present disclosure. As an example, the drying may be performed by drying with warm air, hot air or low-humidity air, vacuum drying, drying by (far) infrared radiation or electron beam radiation, etc. The drying speed is usually adjusted such that the solvent can be removed as quickly as possible within a speed range that does not cause cracks in the positive electrode active material layer or peeling of the positive electrode active material layer from the positive electrode current collector due to stress concentration.

The positive electrode, specifically the positive electrode active material layer, prepared as described above may have a porosity of 50-80 vol %, specifically 60-75 vol %.

When the porosity of the positive electrode is 50-80 vol %, enough electrolyte that can exhibit ionic conductivity and/or electrical conductivity can be maintained between the positive electrode active material because of adequate filling degree of the positive electrode slurry composition containing the positive electrode active material, the conductive material and the binder. As a result, the output characteristics or cycle characteristics of the battery may be improved and the overvoltage and discharge capacity reduction of the battery can be prevented. In addition, adhesivity may be improved because the physical and electrical connection with the current collector is improved, and the energy density of the battery may be improved.

In an exemplary embodiment of the present disclosure, the positive electrode may have a sulfur(S) loading amount of 2-5 mAh/cm$^2$. For example, the sulfur(S) loading amount of the positive electrode may be 2-4 mAh/cm$^2$, 2.5-4 mAh/cm$^2$, 2.5-3.5 mAh/cm$^2$ or 2.5-3.0 mAh/cm$^2$, although the present disclosure is not limited thereto.

Negative Electrode

In an exemplary embodiment of the present disclosure, the negative electrode may be a current collector-free type consisting only of a negative electrode active material layer without including a current collector, or may include a negative electrode current collector and a negative electrode active material layer formed on at least one side of the negative electrode current collector.

In an exemplary embodiment of the present disclosure, the negative electrode may include a negative electrode current collector and a negative electrode active material layer coated on one or both sides of the negative electrode current collector. Alternatively, the negative electrode may be a lithium metal plate.

The negative electrode current collector is for supporting the negative electrode active material layer and is the same as described in the case of the positive electrode current collector.

The negative electrode active material layer may include, in addition to a negative electrode active material, a conductive material, a binder, etc. The conductive material, binder, etc. are the same as described above.

The negative electrode active material may include a material that can reversibly intercalate or deintercalate lithium ions (Li$^+$), a material that can reversibly form a lithium-containing compound by reacting with lithium ions, lithium metal or a lithium alloy.

The material that can reversibly intercalate or deintercalate lithium ions (Li$^+$) may be, for example, crystalline carbon, amorphous carbon or a mixture thereof. The material that can reversibly form a lithium-containing compound by reacting with lithium ions ($Li^+$) may be, for example, tin oxide, titanium nitrate or silicon. The lithium alloy may be, for example, an alloy of lithium (Li) with a metal selected from a group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

In an exemplary embodiment of the present disclosure, the negative electrode active material may be lithium metal, and may be specifically in the form of a lithium metal thin film or a lithium metal powder.

In an exemplary embodiment of the present disclosure, the negative electrode may have a thickness of 40-80 μm. For example, the thickness of the negative electrode may be 50-70 μm or 60 μm. The thickness of the negative electrode may be measured by any known means for measuring the thickness of the components of a battery. For example, it may be measured using a Mitutoyo's thickness meter, although not being limited thereto.

Separator

The separator separates or insulates the positive electrode and the negative electrode from each other and enables the transport of lithium ions between the positive electrode and the negative electrode. It may be made of a porous nonconductive or insulating material and any one that is commonly used as a separator in a lithium-sulfur battery may be used without special limitation. The separator may be an independent member such as a film and may also be a coating layer added to the positive electrode and/or negative electrode.

In an exemplary embodiment of the present disclosure, the separator may be specifically one having low resistance to the transport of ions in the electrolyte and having excellent ability to absorb the electrolyte.

In an exemplary embodiment of the present disclosure, the separator may include a porous substrate. The porous substrate may be any porous substrate commonly used in a secondary battery and a porous polymer film may be used alone or in a laminated manner. For example, a nonwoven fabric made of a high-melting-point glass fiber, a polyethylene terephthalate fiber, etc. or a polyolefin-based porous membrane may be used, although not being limited thereto.

The material of the porous substrate is not specially limited in the present disclosure, and any porous substrate commonly used in an electrochemical device may be used. For example, the porous substrate may be made of one or more material selected from a group consisting of polyolefin such as polyethylene, polypropylene, etc., polyester such as polyethylene terephthalate, polybutylene terephthalate, etc., polyamide, polyacetal, polycarbonate, polyimide, polyether ether ketone, polyethersulfone, poly(phenylene oxide), polyphenylene sulfide, polyethylene naphthalate, polytetrafluoroethylene, polyvinylidene fluoride, polyvinyl chloride, polyacrylonitrile, cellulose, nylon, poly(p-phenylene benzobisoxazole) and polyarylate.

In an exemplary embodiment of the present disclosure, the thickness of the porous substrate is not specially limited but may be 1-100 μm, specifically 5-50 μm. Although the thickness of the porous substrate is not limited to the above ranges, if the thickness is below the lower limit described above, the separator may be damaged easily during the operation of the battery due to deteriorated mechanical properties.

In an exemplary embodiment of the present disclosure, the porous substrate may have an average pore diameter of 0.001-50 μm and a porosity 10-95 vol %, although not being specially limited thereto.

In an exemplary embodiment of the present disclosure, the separator may further include a porous coating layer which is formed on at least one side of the porous substrate and includes an inorganic particle and a binder.

In an exemplary embodiment of the present disclosure, the inorganic particle and the binder included in the porous coating layer are not specially limited as long as they are those commonly used in the porous coating layer of a separator and methods for preparing the same are not specially limited.

Electrolyte

The electrolyte is a medium in which ions involved in the electrochemical reaction of a lithium-sulfur battery can move and includes a non-water-based solvent and a lithium salt as an electrolyte.

The electrolyte is not specially limited as long as it is one that can be used in a lithium secondary battery, specifically a lithium-sulfur battery.

In an exemplary embodiment of the present disclosure, the electrolyte may include a non-water-based solvent, a lithium salt and an additive.

In an exemplary embodiment of the present disclosure, the non-water-based solvent is not specially limited as long as it is one that can be used in a lithium-sulfur battery. For example, an ether-based solvent, an ester, an amide, a linear carbonate, a cyclic carbonate, etc. may be used.

In an exemplary embodiment of the present disclosure, the ester may be, for example, one or more selected from a group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, although not being limited thereto.

In an exemplary embodiment of the present disclosure, the linear carbonate may be, for example, one or more selected from a group consisting of dimethyl carbonate, diethyl carbonate, dipropyl carbonate, ethyl methyl carbonate, methyl propyl carbonate and ethyl propyl carbonate, although not being limited thereto.

In an exemplary embodiment of the present disclosure, the cyclic carbonate may be, for example, one or more selected from a group consisting of ethylene carbonate, propylene carbonate, 1,2-butylene carbonate, 2,3-butylene carbonate, 1,2-pentylene carbonate, 2,3-pentylene carbonate, vinylene carbonate, vinylethylene carbonate and halides thereof. The halides include, for example, fluoroethylene carbonate, etc., although not being limited thereto.

In an exemplary embodiment of the present disclosure, the non-water-based solvent may include an ether-based solvent.

In an exemplary embodiment of the present disclosure, the non-water-based solvent may include the ether-based solvent at a content of 60 vol % or more, e.g., 60-100 vol %, 70-100 vol %, 80-100 vol %, 85-100 vol %, 90-100 vol %, 95-100 vol %, 98-100 vol %, 90-98 vol % or 90-95 vol %, based on total volume of the non-water-based solvent. When the content of the ether-based solvent is within the above ranges based on the total volume of the non-water-based solvent, an advantageous effect may be achieved in terms of the solubility of the components of the electrolyte, such as the lithium salt, etc., although the present disclosure is not limited thereto.

In an exemplary embodiment of the present disclosure, the ether-based solvent may include an acyclic ether, a cyclic ether or a mixture thereof.

In an exemplary embodiment of the present disclosure, the acyclic ether may include, for example, one or more selected from a group consisting of dimethyl ether, diethyl ether, dipropyl ether, dibutyl ether, diisobutyl ether, ethyl methyl ether, ethyl propyl ether, ethyl t-butyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetraethylene glycol dimethyl ether, ethylene glycol divinyl ether, diethylene glycol divinyl ether, triethylene glycol divinyl ether, dipropylene glycol dimethylene ether, butylene glycol ether, diethylene glycol ethyl methyl ether, diethylene glycol isopropyl methyl ether, diethylene glycol butyl methyl ether, diethylene glycol t-butyl ethyl ether and ethylene glycol ethyl methyl ether. Specifically, it may include one or more selected from a group consisting of dimethyl ether, dimethoxyethane, diethoxyethane, diethylene glycol dimethyl ether, triethylene glycol dimethyl ether and tetraethylene glycol dimethyl ether, more specifically dimethoxyethane.

In an exemplary embodiment of the present disclosure, the cyclic ether may include, for example, one or more selected from a group consisting of 2-methylfuran, 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxybenzene, 1,3-dimethoxybenzene, 1,4-dimethoxybenzene and isorbide dimethyl ether. Specifically, it may include one or more selected from a group consisting of 2-methylfuran, 1,3-dioxolane, tetrahydrofuran, 2-methyltetrahydrofuran and 2,5-dimethyltetrahydrofuran, more specifically 2-methylfuran.

In an exemplary embodiment of the present disclosure, the non-water-based solvent may include a mixture of an acyclic ether and a cyclic ether.

In an exemplary embodiment of the present disclosure, the non-water-based solvent may include dimethoxyethane (DME) and 2-methylfuran (2-MeF).

In an exemplary embodiment of the present disclosure, the volume ratio of the acyclic ether and the cyclic ether may be 5:95 to 95:5 (v/v), specifically 95:5 to 50:50, more specifically 90:10 to 70:30, 85:15 to 75:25 or 80:20 (v/v). In the present disclosure, the volume ratio corresponds to "the vol % of the acyclic ether":"the vol % of the cyclic ether" in the ether-based solvent.

In an exemplary embodiment of the present disclosure, the non-water-based solvent may not include a carbonate-based solvent in terms of the solubility of the electrolyte. Alternatively, the non-water-based solvent may include a trace amount of the carbonate-based solvent such that the carbonate-based solvent does not affect the solubility of the lithium salt. For example, when the non-water-based solvent includes the carbonate-based solvent, the content of the carbonate-based solvent may be 3 wt % or less, 2 wt % or less, 1 wt % or less, 0.5 wt % or less or 0 wt % (i.e., not included at all) based on the total weight of the electrolyte for a lithium secondary battery.

In an exemplary embodiment of the present disclosure, the lithium salt is not specially limited as long as it is one that can be used as an electrolyte of a lithium secondary battery. The lithium salt may include, for example, one or more of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiCABO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$FsSO$_2$)$_2$NLi, (SO$_2$F)$_2$NLi, (CF$_3$SO$_2$)$_3$CLi, lithium chloroboracite, a lithium lower aliphatic carbonate, lithium tetraphyenylborate and lithium imide.

In an exemplary embodiment of the present disclosure, the content of the lithium salt may be determined appropriately in consideration of ionic conductivity, solubility, etc. For example, the content may be 0.1-4 M, specifically 0.5-2 M. When the content of the lithium salt is within the above ranges, an advantageous effect may be exhibited in terms of ensuring ionic conductivity suitable for driving a battery, or improving the motility of lithium ions and suppressing the decomposition of the lithium salt itself due to adequate viscosity of the electrolyte, although the present disclosure is not limited thereto.

In an exemplary embodiment of the present disclosure, the additive may also include a nitrogen compound in order to improve the electrical conductivity of the electrolyte and the lifetime of the lithium-sulfur battery.

Specifically, the nitrogen compound may, for example, prevent the irreversible consumption of polysulfide by suppressing the reduction of polysulfide occurring during charge/discharge of a lithium-sulfur battery and, thereby, improve the performance of the lithium-sulfur battery, although its effect is not limited thereto.

In an exemplary embodiment of the present disclosure, the nitrogen compound is not specially limited as long as it stably forms a solid-electrolyte interphase (SEI) of the negative electrode and improves charge/discharge efficiency. For example, a nitric acid-based compound, a nitrous acid-based compound or a mixture thereof may be used.

In an exemplary embodiment of the present disclosure, the nitrogen compound may be, for example, selected from a group consisting of an inorganic nitric acid or nitrous acid-based compound such as lithium nitrate (LiNO$_3$), potassium nitrate (KNO$_3$), cesium nitrate (CsNO$_3$), barium nitrate (Ba(NO$_3$)$_2$), ammonium nitrate (NH$_4$NO$_3$), lithium nitrite (LiNO$_2$), potassium nitrite (KNO$_2$), cesium nitrite (CsNO$_2$), ammonium nitrite (NH$_4$NO$_2$), etc.; an organic nitric acid or nitrous acid-based compound such as methyl nitrate, a dialkyl imidazolium nitrate, guanidine nitrate, imidazolium nitrate, pyridinium nitrate, ethyl nitrite, propyl nitrite, butyl nitrite, pentyl nitrite, octyl nitrite, etc.; an organic nitro compound such as nitromethane, nitropropane, nitrobutane, nitrobenzene, dinitrobenzene, nitropyridine, dinitropyridine, nitrotoluene, dinitrotoluene, etc.; and combination thereof, specifically lithium nitrate.

In an exemplary embodiment of the present disclosure, the nitrogen compound may be included at a content of for example, 1-10 wt %, 2-10 wt % or 3-10 wt %, specifically 3-8 wt %, 3-6 wt % or 3-5 wt %, based on the total weight of the electrolyte, although not being limited thereto. When the content of the nitrogen compound is within the above ranges, a more advantageous effect may be exhibited in terms of improving the electrical conductivity of the electrolyte and suppressing the reduction of polysulfide when used in a lithium-sulfur battery, although the present disclosure is not limited thereto.

In an exemplary embodiment of the present disclosure, the weight ratio of the electrolyte and sulfur(S) in the sulfur-carbon composite of the positive electrode (El/S weight ratio) may be 2.7 g/g or higher, 2.8 g/g or higher, 2.9 g/g or higher or 3.0 g/g or higher. For example, the El/S ratio may be 2.7-4.0 g/g, 2.8-3.7 g/g, 2.9-3.5 g/g, 3.0-3.5 g/g, 2.8-3.4 g/g, 2.9-3.4 g/g or 3.0-3.4 g/g. Here, the El refers to the weight of the electrolyte, and S refers to the weight of sulfur(S) included in the positive electrode.

In one embodiment of the present invention, the El/S ratio of the lithium-sulfur battery may be calculated by the ratio of the weight of sulfur in the sulfur-carbon composite of the positive electrode and the weight of the electrolyte added during the manufacturing process.

In another embodiment of the present invention, the El/S ratio of the lithium-sulfur battery can be calculated by the ratio of the weight of sulfur in the sulfur-carbon composite of the positive electrode and the weight of the introduced electrolyte analyzed by disassembling the battery.

In an exemplary embodiment of the present disclosure, when analyzing the El/S ratio of a lithium-sulfur battery by following steps: measuring the total weight of the lithium-sulfur battery in a charged state, then disassembling the battery, washing the positive electrode, negative electrode, separator, and case with a solvent, drying, calculating the sum of each weight of the positive electrode, negative electrode, separator, and case, and excluding the sum weight of them from the total weight of the measured battery. At this time, it is preferable to use a solvent capable of extracting the electrolyte from the positive electrode, negative electrode, separator, and case for the washing. Next, after separating the positive electrode active material layer and the current collector from the dried positive electrode, the weight of sulfur in the positive electrode can be measured by measuring the weight of sulfur derived from the sulfur-carbon complex present in the positive electrode active material layer. The El/S ratio of the lithium-sulfur battery can be calculated based on the ratio of the weight of sulfur in the sulfur-carbon composite of the positive electrode and the weight of the added electrolyte obtained in this way.

In one embodiment of the present invention, the method of measuring the weight of sulfur derived from the sulfur-carbon complex present in the positive electrode active material layer includes, for example, thermogravimetric analysis (TGA) of the result obtained by scraping the obtained positive electrode active material layer, but the measurement method is not limited to this.

In one embodiment of the present invention, the state of charge for disassembling the lithium-sulfur battery may be a fully charged state, that is, SOC 100%.

In another embodiment of the present invention, the state of charge for disassembling the lithium-sulfur battery may be SOC 95% to SOS 100%.

In one embodiment of the present invention, disassembly of the charged lithium-sulfur battery may be performed under an inert atmosphere in aspect of safety. For example, disassembly of a lithium-sulfur battery can be performed under an Ar atmosphere.

When the ratio of the electrolyte included in the positive electrode of the lithium-sulfur battery per sulfur weight (El/S) satisfies the above ranges, the reduction of the positive electrode active material may occur smoothly even when the lithium-sulfur battery is discharged at a high C-rate. In addition, capacity may be improved greatly when it is discharged at a high C-rate and the decrease in capacity may be smaller as compared to when it is discharged at a low C-rate.

In an exemplary embodiment of the present disclosure, the lithium-sulfur battery may have an energy density of 300 Wh/kg or higher. For example, the energy density of the lithium-sulfur battery may be 300-500 Wh/kg or 300-400 Wh/kg.

In an exemplary embodiment of the present disclosure, the lithium-sulfur battery may exhibit superior effect of maintaining an energy density exhibited when it is discharged at a high discharge rate, comparably to the energy density exhibited when it is discharged at a low discharge rate.

For example, the lithium-sulfur battery may exhibit an energy density measured when it is discharge at 1.0 C-rate, which is 90% or higher of the energy density measured when it is discharge at 0.5 C-rate.

In addition, the lithium-sulfur battery may exhibit an energy density measured when it is discharge at 2.0 C-rate, which is 90% or higher of the energy density measured when it is discharge at 1.0 C-rate.

In an exemplary embodiment of the present disclosure, the energy density of the lithium-sulfur battery may be measured by a known method without special limitation. For example, the energy density of the lithium-sulfur battery may be calculated according to the following equations after evaluating discharge capacity by discharging the lithium-sulfur battery once at 0.5 C-rate and at room temperature from 2.5 V to 1.8 V, charging once at 1.0 C-rate to 2.5 V and then conducting discharging at a constant rate selected from 0.5-2.0 C-rate.

$$\text{Energy density} = [(\text{discharge capacity} \times \text{driving voltage})]/(\text{cell weight}) \quad [\text{Equation}]$$

In this equation, the discharge capacity, the driving voltage and the cell weight may be measured in mAh, V and kg units, respectively, and the energy density may be calculated by the following equation.

$$\text{Energy density (Wh/kg)} = \{[(\text{discharge capacity (mAh)} \times \text{driving voltage (V)})/1000]/(\text{cell weight (kg)})\} \quad [\text{Equation}]$$

In an exemplary embodiment of the present disclosure, the room temperature may be, for example, 23-25° C., specifically 23° C.

In an exemplary embodiment of the present disclosure, the specific capacity of the lithium-sulfur battery may be, for example, 1,000 mAh/g or higher.

In an exemplary embodiment of the present disclosure, the specific capacity of the lithium-sulfur battery may be measured, for example, by discharging the battery at room temperature and at 0.5 C-rate once within a range of 1.8-2.5 V, charging at 0.5 C-rate, and then discharging the battery.

In an exemplary embodiment of the present disclosure, the room temperature may be 23-25° C.

In an exemplary embodiment of the present disclosure, the lithium-sulfur battery may be a coin-type battery, a pouch-type battery or a cylindrical battery, although not being limited thereto.

In another aspect, the present disclosure provides a method for evaluating the high-output characteristics of a lithium-sulfur battery using Equation 1.

The evaluation method includes a step of determining as a high-output battery when a ratio R(1.0 C/0.5 C) defined by Equation 1 is 80% or higher:

In an exemplary embodiment of the present disclosure, the high-output battery may be, for example, a battery which maintains an energy density of 300 Wh/kg or higher when discharged at room temperature at 1.0 C-rate or higher. In an exemplary embodiment of the present disclosure, the room temperature may be 23-25° C.

EXAMPLES

Hereinafter, the present disclosure is described more superficially through examples. However, the following examples merely for illustrating the present disclosure and the scope of the present disclosure is not limited thereto.
Preparation of Lithium-Sulfur Battery Example 1

A sulfur-carbon composite wherein sulfur ($S_8$) was supported on carbon nanotube (MWCNT) (S/C weight ratio=2.3 g/g) was prepared as a positive electrode active material. A positive electrode slurry composition was prepared by adding the prepared sulfur-carbon composite and PAA (polyacrylic acid) as a binder to water at a weight ratio 96:4. A positive electrode was prepared by coating the positive electrode slurry composition on an aluminum current collector and drying the same. The loading amount of the positive electrode was 2.7 mAh/cm$^2$.

Lithium metal with a thickness of 60 μm was prepared as a negative electrode.

After placing the positive electrode and the negative electrode to face each other, an electrode assembly was prepared by disposing a polyethylene separator with a thickness of 16 μm and a porosity of 46 vol % therebetween.

After housing the prepared electrode assembly in a pouch-type case, a lithium-sulfur battery was prepared by injecting an electrolyte wherein 0.75 M of a lithium salt (LiTFSI) and 3 wt % of lithium nitrate (LiNO$_3$) were dissolved in an 8:2 (v/v) mixture solvent of dimethoxyethane and 2-methylfuran (2-MeF) to an El/S ratio of 3.0 g/g.

Example 2

A lithium-sulfur battery was prepared in the same manner as in Example 1 except that the electrolyte was injected to an El/S ratio of 3.4 g/g.

Comparative Example 1

A lithium-sulfur battery was prepared in the same manner as in Example 1 except that the electrolyte was injected to an El/S ratio of 2.6 g/g.
Analysis of Li$_2$S Production and Evaluation of Battery Performance Battery capacity (mAh) and energy (Wh) were measured while charging the lithium-sulfur batteries of Example 1, Example 2 and Comparative Example 1 at room temperature (23° C.) to 2.4 V at 0.5 C-rate and then discharging to 1.8 V at 0.5 C-rate, 1.0 C-rate or 2.0 C-rate. Then, specific capacity (mAh/g) and energy density (Wh/kg) of the batteries were evaluated by dividing the results by battery capacity. The result is shown in FIG. 1 and FIG. 2.

Figure 3:
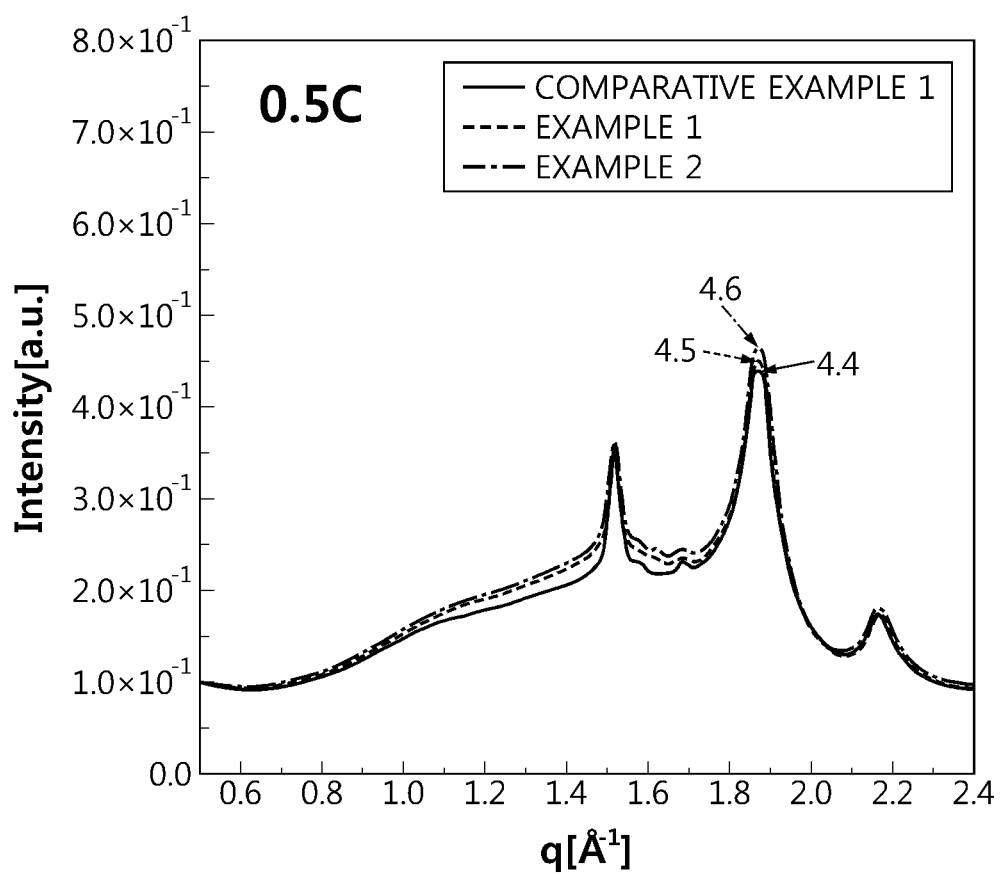
FIG. 3 shows the nominal voltage of lithium-sulfur batteries of Example 1, Example 2 and Comparative Example 1 when discharged at 0.5 C-rate and 1.0 C-rate.

In addition, the average discharge voltage, i.e., the nominal voltage, of the batteries was compared for discharge at 0.5 C-rate and 1.0 C-rate. The result is shown in FIG. 3.

From FIG. 1, it can be seen that, whereas the lithium-sulfur batteries of Example 1 and Example 2 showed small decrease in energy density (maintained at 300 Wh/kg or higher for both) when they were discharged at 2.0 C-rate, the lithium-sulfur battery of Comparative Example 1 showed significant decrease in the energy density.

Figure 2:
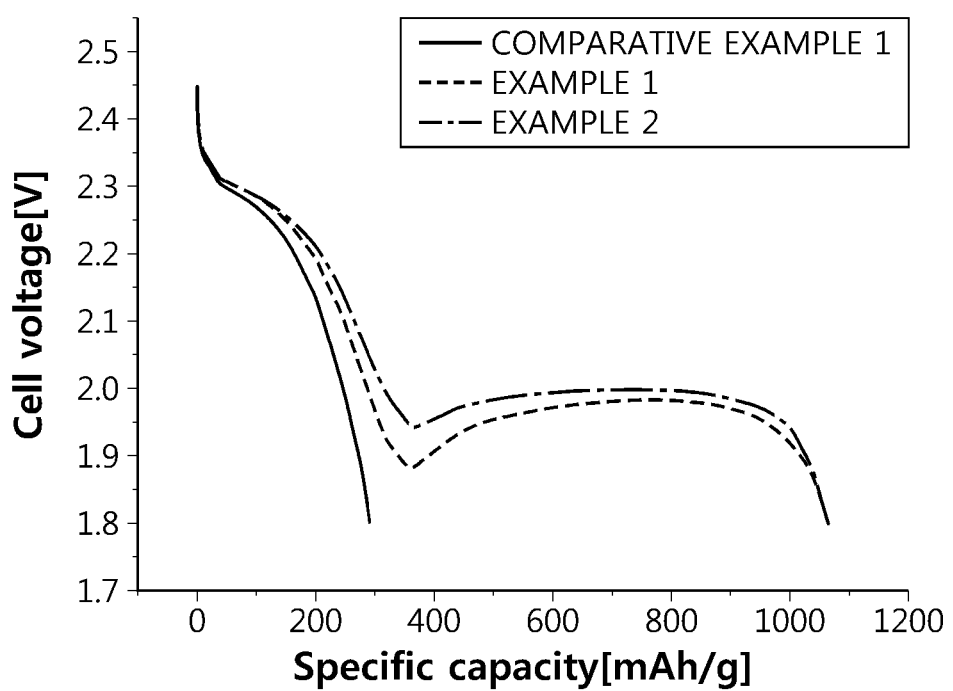
FIG. 2 shows the cell voltage of lithium-sulfur batteries of Example 1, Example 2 and Comparative Example 1 depending on specific capacity.

FIG. 2 shows the result obtained when the batteries were discharged to 1.8 V at 2.0 C-rate. It can be seen that, whereas the lithium-sulfur batteries of Example 1 and Example 2 showed a specific capacity of 1000 mAh/g or higher, the lithium-sulfur battery of Comparative Example 1 showed a much lower specific capacity.

In addition, it can be seen that the lithium-sulfur battery of Comparative Example 1, wherein El/S was 2.6, showed significant decrease in capacity and energy density when it was discharged at 2.0 C.

Referring to FIG. 1 and FIG. 3, it can be seen that, although an energy density of 300 Wh/kg or higher was maintained for Comparative Example 1 when discharged at 1.0 C, the nominal voltage was much lower as compared to Example 1 or Example 2.

Figure 4:
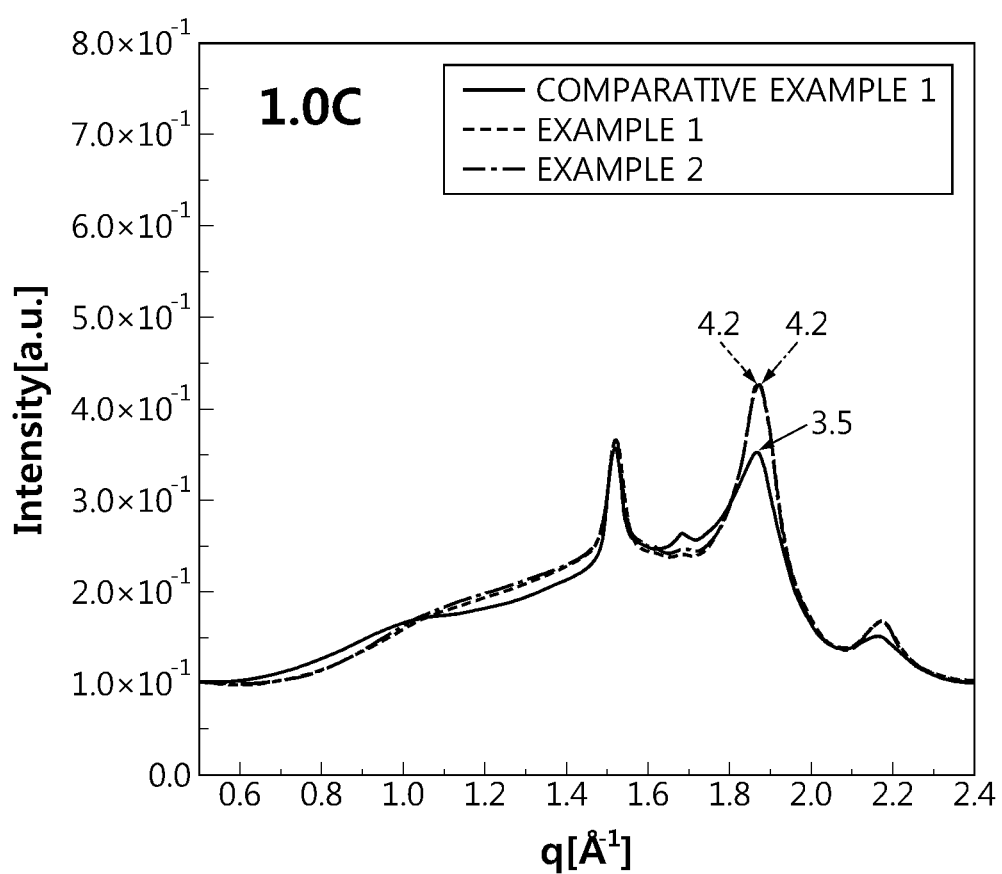
FIG. 4 shows the production of Li$_2$S when lithium-sulfur batteries of Example 1, Example 2 and Comparative Example 1 were discharged at 0.5 C-rate.
Figure 5:
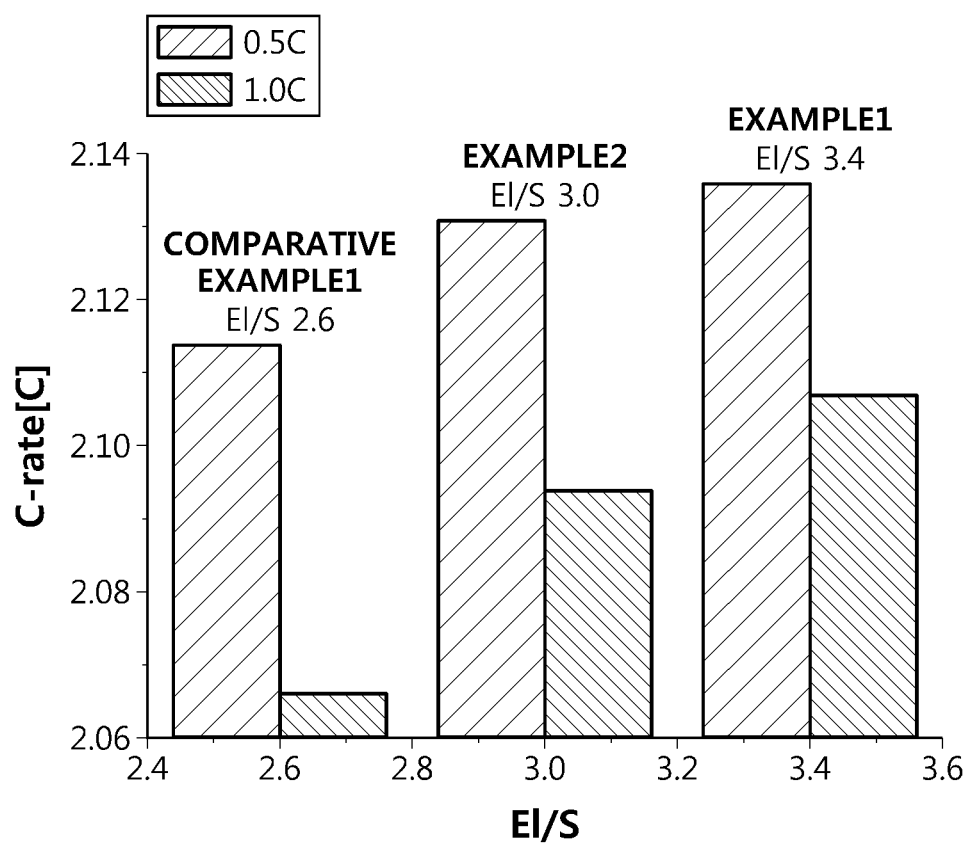
FIG. 5 shows the production of Li$_2$S when lithium-sulfur batteries of Example 1, Example 2 and Comparative Example 1 were discharged at 1.0 C-rate.

FIG. 4 and FIG. 5 show the result of analyzing the amount of Li$_2$S in the lithium-sulfur batteries of Example 1, Example 2 and Comparative Example 1 after they were discharged to 1.8 V (DoD 100) at 0.5 C or 1.0 C.

For measurement of the amount of Li$_2$S in the discharged state, XRD patterns were obtained for the discharged lithium-sulfur batteries as follows.

First, an XRD pattern was obtained while discharging each battery at room temperature (23° C.) within a range of 2.4-1.8 V at 0.5 C-rate or 1.0 C-rate. Specifically, the XRD pattern was measured using Mo K-alpha X-ray ($\lambda$=0.709 Å) of PANalyical Empyrean XRD with 2 theta (2θ) values of 4-17 in a transmission mode. Each pattern was measured at 0.014° intervals for a total of 1 minute. The XRD measurement was performed using a pressing jig equipped with a Be window. The scattering intensities are given in arbitrary units (a.u.) in FIG. 4 and FIG. 5.

Li$_2$S has characteristic peaks in the scattering vector (q) region of 1.85-1.92 Å$^{-1}$ in the X-ray diffraction spectrum. The amount of Li$_2$S can be determined from the peak intensities (i.e., scattering intensities). The scattering vector (q) region of 1.4-1.6 Å$^{-1}$ may also show characteristic peaks for Li$_2$S, however they were not used for further quantification because this region can overlap with the scattering vector (q) region of $S_8$. Hence, only the characteristic peaks in the scattering vector (q) region of 1.85-1.92 Å$^{-1}$ were used for quantification of Li$_2$S. In addition, since Li$_2$S crystal has a small number of broad peaks, the range of q values in the graph is sufficiently wide and there are no other characteristic peaks.

FIG. 4 and FIG. 5 show the result of measuring the peak intensities of Li$_2$S when discharged at 0.5 C (FIG. 4) and 1.0 C (FIG. 5), respectively. The ratio R(1.0 C/0.5 C) of lithium sulfide defined by Equation 1 was calculated using the results of FIG. 4 and FIG. 5 and is given in Table 1.

$$R(1.0\ C/0.5\ C) = [A(DoD\ 100)_{1.0\ C}/A(DoD\ 100)_{0.5\ C}] \times 100(\%) \quad \text{[Equation 1]}$$

In Equation 1,
the $A(DoD\ 100)_{1.0\ C}$ is the amount of lithium sulfide (Li$_2$S) existing in the state of DoD 100 after discharge at 1.0 C, and
the $A(DoD\ 100)_{0.5\ C}$ is the amount of lithium sulfide (Li$_2$S) existing in the state of DoD 100 after discharge at 0.5 C.

The $A(DoD\ 100)_{1.0\ C}$ and the $A(DoD\ 100)_{1.0\ C}$ were determined from the peak intensities of the XRD pattern.

TABLE 1

|  | Comparative Example 1 | Example 1 | Example 2 |
|---|---|---|---|
| $A(DoD\ 100)_{1.0\ C}$ | $3.5 \times 10^{-1}$ | $4.2 \times 10^{-1}$ | $4.2 \times 10^{-1}$ |
| $A(DoD\ 100)_{0.5\ C}$ | $4.4 \times 10^{-1}$ | $4.5 \times 10^{-1}$ | $4.6 \times 10^{-1}$ |
| $R(1.0\ C/0.5\ C)$ | 79% | 93% | 91% |

From FIG. 4, FIG. 5 and Table 1, it can be seen that the production of Li$_2$S was significantly less when the lithium-sulfur battery of Comparative Example 1 was discharged at 1.0 C.

From these results, it can be seen that, whereas the batteries Examples 1 and 2 exhibited high-output characteristics with the ratio R(1.0 C/0.5 C) of lithium sulfide as 85% or higher, the battery of Comparative Example 1 did not exhibit high-output characteristics.

Although the present disclosure has been described with limited examples and drawings, the present disclosure is not limited thereto but can be changed and modified variously within the technical idea of the present disclosure and the equivalent scope of the appended claims.

What is claimed is:

1. A lithium-sulfur battery comprising:
    a positive electrode comprising a sulfur-carbon composite;
    a negative electrode;
    a separator disposed between the positive electrode and the negative electrode; and
    an electrolyte,
    wherein the lithium-sulfur battery has an energy density of 300 Wh/kg or more at 2.0 C discharge rate,
    wherein the lithium-sulfur battery has a ratio R(1.0 C/0.5 C) according to the following Equation 1 of 80% or more, $$R(1.0\ C/0.5\ C) = [A(DoD\ 100)_{1.0\ C}/A(DoD\ 100)_{0.5\ C}] \times 100(\%) \quad \text{[Equation 1]}$$

wherein $A(DoD\ 100)_{1.0\ C}$ is an amount of lithium sulfide (Li$_2$S) present at 100% depth of discharge state (DoD 100) of the lithium-sulfur battery discharged at 1.0 C, $A(DoD\ 100)_{0.5\ C}$ is an amount of lithium sulfide (Li$_2$S) present at DoD 100 of the lithium-sulfur battery discharged at 0.5 C, wherein the amount of the lithium sulfide (Li$_2$S) is a weight, a volume, or a number of moles of the lithium sulfide (Li$_2$S), and the ratio R(1.0 C/0.5 C) is determined based on a ratio of peak intensities of the lithium sulfide (Li$_2$S) in a scattering vector (q) region of from 1.85 to 1.92 Å$^{-1}$ in an X-ray diffraction (XRD) spectrum of the lithium-sulfur battery.

2. The lithium-sulfur battery according to claim 1, wherein the lithium-sulfur battery has R(1.0 C/0.5 C) of 85% or more.

3. The lithium-sulfur battery according to claim 1, wherein the lithium-sulfur battery at DoD 100 has a potential of from 1.7 to 1.9 V.

4. The lithium-sulfur battery according to claim 1, wherein the lithium-sulfur battery at DoD 100 has a potential of 1.8 V.

5. The lithium-sulfur battery according to claim 1, wherein the lithium-sulfur battery has a weight ratio of the electrolyte to sulfur element (S) in the sulfur-carbon composite (El/S weight ratio) of 2.7 g/g or more.

6. The lithium-sulfur battery according to claim 1, wherein the electrolyte comprises a non-water-based solvent, a lithium salt, and an additive.

7. The lithium-sulfur battery according to claim 1, wherein the sulfur-carbon composite includes sulfur element (S) in an amount of from 60 to 85 wt %.

8. The lithium-sulfur battery according to claim 1, wherein the positive electrode comprises the sulfur-carbon composite in an amount of 90 wt % or more based on the total weight of the positive electrode.

9. The lithium-sulfur battery according to claim 1, wherein the lithium-sulfur battery is a coin-type battery, a pouch-type battery or a cylindrical battery.

10. The lithium-sulfur battery according to claim 1, wherein the lithium-sulfur battery has R(1.0 C/0.5 C) of 90% or more.

* * * * *